United States Patent

[11] 3,582,929

| [72] | Inventor | William R. Dollase<br>Racine, Wis. |
|---|---|---|
| [21] | Appl. No. | 813,045 |
| [22] | Filed | Apr. 3, 1969 |
| [45] | Patented | June 1, 1971 |
| [73] | Assignee | J. I. Case Company<br>Racine, Wis. |

[54] TRANSMISSION CLUTCH FLUID PRESSURE-INDICATING SYSTEM
9 Claims, 10 Drawing Figs.

[52] U.S. Cl. ............................................. 340/236,
  74/753, 180/82, 192/30;87.1
[51] Int. Cl. ............................................. G08b 5/00,
  F16b 3/44;F16d 11/00;
[50] Field of Search ................................... 340/236;
  73/205, 398; 180/82; 74/753; 192/30 W, 3.5 FE, 87.1

[56] References Cited
UNITED STATES PATENTS
2,778,007  1/1957  Berchin et al. ............... 340/236
2,798,129  7/1957  Reese et al. .................. 340/236X Primary Examiner—Thomas B. Habecker
Assistant Examiner—Daniel Myer
Attorney—Settle, Batchelder and Oltman

ABSTRACT: A circuit for monitoring fluid pressures in hydraulic clutches of a transmission to facilitate adjustment of the clutches to obtain proper shifting in the operation of the transmission. Pressures in at least two clutches are sensed by pressure-responsive switches included in the monitoring circuit, and these switches control three condition indicators of the circuit. Actuation of a first condition indicator shows that a proper shift has been made, and the first indicator is actuated only when both pressures switches are switching at substantially the same time. When the pressure switches switch sequentially rather than at the same time, one of the other two indicators is actuated, the particular indicator depending on the sequence in which the pressure switches operate. By monitoring the shifting of the clutches with this circuit, the clutches can be adjusted until shifting of the clutches causes the first indicator to be actuated, and when this result is obtained, a proper shift occurs.

INVENTOR.
WILLIAM R. DOLLASE.
BY
SETTLE, BATCHELDER & OLTMAN.
ATT'YS.

INVENTOR.
WILLIAM R. DOLLASE.
BY
SETTLE, BATCHELDER & OLTMAN.
ATT'YS.

3,582,929

TRANSMISSION CLUTCH FLUID PRESSURE-INDICATING SYSTEM

BACKGROUND OF THE INVENTION

A combination mechanical and hydraulic transmission and transmission control is described in a copending application Ser. No. 612,013, filed Jan. 26, 1967, now U.S. Pat. No. 3,469,472, by John E. Bislew and assigned to the present assignee. This transmission is particularly useful in heavy-duty vehicles such as agricultural and light industrial tractors, and is designed to allow operation of the transmission at a relatively large number of fixed ground speeds. In one embodiment of this transmission, a total of 12 ground speeds are available to the operator because for each of four mechanically selected speed positions, he has the option of hydraulically selecting three additional speed positions. The hydraulic selection is made through a range-changing unit which may include a lever operable manually to supply hydraulic fluid selectively through a hydraulic system to four clutches which are part of the transmission.

One of these clutches provides reverse drive, and will not be considered herein. The other three clutches enter into forward speed selection, and will be identified for purposes of description as C1, C2 and C3. Different forward speeds are obtained by selectively engaging pairs of these clutches. For example, a low speed is obtained when clutches C1 and C2 are engaged, an intermediate speed is obtained when clutches C1 and C3 are engaged, and a high speed is obtained when clutches C2 and C3 are engaged.

It is clearly very desirable to be able to shift from one of these speeds or speed ranges to another as smoothly as possible. To obtain this result, the shift or swap of the clutches must occur very rapidly. Studies show that this can be done; in fact, the shift may be made in about one-tenth of a second. However, it is necessary to tune each clutch combination in order to achieve the desired smooth shifting. Specifically, shifting involves a decrease or decay of hydraulic pressure in one clutch in order to release that clutch and an increase of pressure in another clutch in order to engage that clutch. If the decaying or "coming down" clutch is completely depressurized before the increasing or "coming up" clutch begins to be pressurized, the engine of the vehicle would be momentarily disconnected from the transmission. The vehicle would be without power, and the load would be "dropped". Then the "coming up" clutch would be pressurized, and the engine would be connected to the "dead load" suddenly. The result would be a quick startup, a wound-up transmission train, high-stress loading on all parts and a jolted operator. On the other hand, if the "coming up" clutch is fully pressurized before the "coming down" clutch begins to experience depressurization, the transmission would be locked.

It has been found that if the "coming down" clutch can be held in a partially pressurized condition until the "coming up" clutch is partially pressurized, a smooth shift will occur. The clutches can be controlled in this manner, for example by providing adjustable orifices in their hydraulic circuits. However, it is necessary to adjust these orifices or other suitable controls carefully to assure that the shift takes place at the right pressures.

In the past, it has been necessary to use highly specialized equipment such as oscilloscopes, oscillographs and other equipment to monitor each pair of clutches during shifting to facilitate setting of the controls of the clutches to achieve proper shifting. However, it may be necessary to make these adjustments both in production of transmissions and transmission controls and also in servicing of such transmissions and controls in the field. It would be impractical and expensive to provide specialized monitoring equipment of the type referred to above to production and field personnel for use in adjusting the clutches. What is needed is a simple, standard instrument for monitoring pressure in the clutches as a shift takes place which will provide an easily recognizable readout or indication to facilitate adjustment of the clutches.

SUMMARY OF THE INVENTION

The present invention is a circuit for monitoring pressures in the hydraulic circuits of the clutches referred to above and for providing a readout which will facilitate adjustment of the clutches to obtain proper shifting. In the embodiment of the invention to be described herein, the readout is provided by visual indicators, specifically lamps, but other forms of readout could be employed. In this embodiment, two pressure-responsive switches are provided for sensing pressures in the hydraulic circuits of any two clutches. Three indicator lamps are also provided. The circuit also includes relays interconnected with the pressure switches and the lamps in a manner to be described. The swap shift should occur before the pressure in the "up coming" clutch reaches a maximum threshold value and the pressure in the "downcoming" clutch reaches a minimum threshold value. The pressure switches are actuated at these values, and the circuit is arranged such that the pressure switches actuate a first indicator to show a proper shift only when both pressure switches have switched concurrently. If the pressure switch for the "upcoming" clutch has switched before the pressure switch for the "downcoming" clutch switches, a second indicator is actuated. On the other hand, if the pressure switch for the "downcoming" clutch has switched before the pressure switch for the "upcoming" clutch switches, a third indicator is actuated. Actuation of the second and third indicators tells the monitoring personnel that the controls for the clutches must be adjusted. Actuation of the first indicator tells the monitoring personnel that the controls are properly adjusted.

Accordingly, it is an object of the present invention to provide a circuit for monitoring hydraulically controlled clutches of a transmission to facilitate adjustment of the clutches to obtain proper shifting.

Another object of the invention is to provide a monitoring circuit in which switches responsive to pressure in the hydraulic circuit of clutches for a transmission control indicators to provide a readout of the condition of the clutches during shifting to facilitate adjustment of the clutches.

A further object of the invention is to provide a monitoring circuit as described in the preceding paragraph wherein a definite indication of a proper shift of the clutches is provided.

A further object of the invention is to produce the indication of a proper shift only when the two pressure-responsive switches switch concurrently.

Among the other objects of the invention are to provide a monitoring circuit which is simple, reliable, economical, and relatively foolproof in operation.

Other objects of this invention will appear in the following description and appended claims, reference being had to the accompanying drawings forming a part of this specification wherein like reference characters designate corresponding parts in the several views.

ON THE DRAWINGS

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation. In particular, the term "clutches" as used herein is intended to embrace clutches of various types including friction devices of the type sometimes called brakes.

AS SHOWN ON THE DRAWINGS

Figure 1:
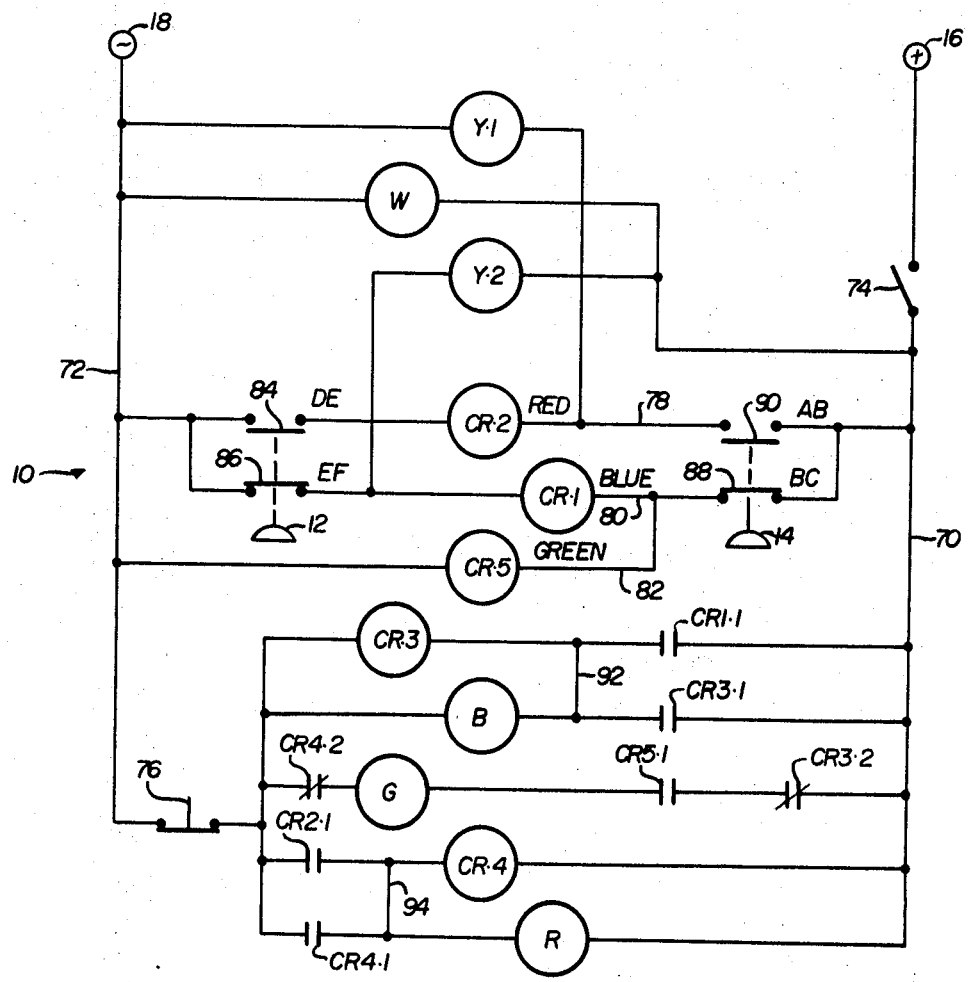
FIG. 1 is a schematic diagram of a monitoring circuit in accordance with one embodiment of the invention.

A monitoring circuit 10 is shown in FIG. 1 in accordance with one embodiment of the invention. The monitoring circuit includes two pressure-responsive switches 12 and 14 for sensing pressure in the hydraulic circuits of two clutches which will be described hereinafter. The circuit 10 also includes five relays identified as CR1, CR2, CR3, CR4 and CR5. The contacts of these relays are identified by the relay reference character (for example, CR1) followed by a number for the contacts (for example, CR1-1). The monitoring circuit 10 is actually a logic circuit, and readout is obtained from this circuit by means of indicator lamps identified as B for blue, G for green and R for red. Obviously, other forms of readout could be used, and even when lamps are used, the colors could be different. In this particular circuit, additional readout is obtained from two lamps labeled Y for yellow and one lamp labeled W for white. The manner in which these components are connected and in which they operate will be described later. It will suffice at this point to note that direct current voltage is supplied to terminals 16 and 18, this particular circuit being designed to operate on 12 volts of direct current.

Figure 2:
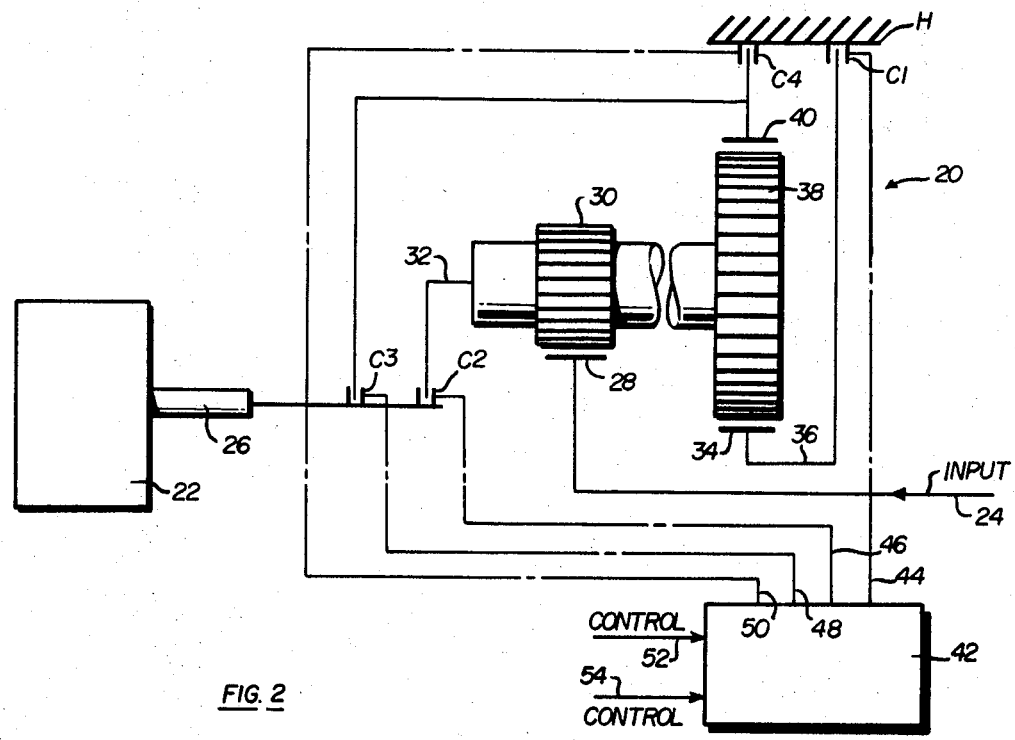
FIG. 2 is a schematic diagram of a portion of a transmission and transmission control which may be monitored with the aid of the circuit of FIG. 1.

FIG. 2 shows a portion of a transmission and transmission control which can be monitored by the circuit of FIG. 1. In FIG. 2, there is shown a planetary drive unit 20 and a slidable gear drive unit 22. The multiple speed planetary drive unit 20 includes an input shaft 24, which is driven by a power source (not shown), and an output shaft 26. A first sun gear 28 is fixedly secured to the input shaft and is in constant mesh with a first set of planetary gears 30 carried by planetary carrier 32.

A second sun gear 34 is fixedly secured to a hollow shaft 36 with the sun gear 34 being in constant mesh with a second set of planet gears 38 (only one being shown), also carried by the planetary carrier 32. A ring gear 40 is also in constant mesh with second set of planet gears 38.

The hollow shaft 36 is adapted to be fixed to the transmission housing H through a first clutch C1. The planetary carrier 32 and ring gear 40 are operatively interconnected with the output shaft 26 through second and third clutches C2 and C3, respectively. The ring gear 40 is adapted to be fixed to the housing H of the transmission through a fourth clutch C4. For purposes of simplicity, only portions of the housing are represented in schematic and are commonly identified by the letter H, it being understood that the housing encloses the entire transmission including the units 20 and 22.

As will be understood to those versed in the art, each clutch is engaged by supplying fluid under pressure to a movable pressure plate (not shown) which engages the selected clutch plate with the clutch housing. By proper selection of a respective pair of clutches, the output shaft 26 may be driven at any one of three forward speeds with respect to the input shaft 24 and also be driven in one reverse speed with respect to the input shaft 24.

The first forward speed is obtained by frictionally engaging clutches C1 and C2 to fix sun gear 36 to the housing H and planetary carrier 32 to the output shaft 26 and thereby drive the output shaft 26 through the sun gear 28 and planet gears. The second or intermediate forward speed is achieved by frictionally engaging clutches C1 and C3, which will stop rotation of shaft 36 and sun gear 34, to rotate the output shaft through ring gear 40 and the planet gears 38 about the fixed sun gear 34. The third or high speed is accomplished by frictionally engaging clutches C2 and C3 to obtain a direct drive between the input and output shafts of the planetary gear set, while the reverse speed is accomplished by frictionally engaging the second clutch C2 to interconnect the planetary carrier with the output shaft 26 and engagement of the fourth clutch C4 to discontinue rotation of the ring gear.

The three forward speeds available for selection may be identified as:

| 1st | Low | Clutches C1 and C2 engaged. |
|---|---|---|
| 2nd | Intermediate | Do. |
| 3rd | High | Do. |

Figure 3:
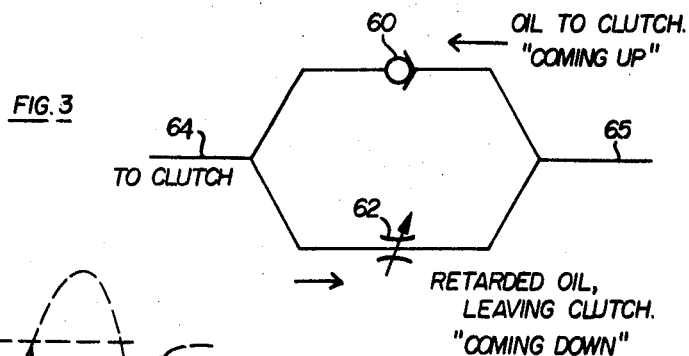
FIG. 3 is a schematic diagram of a portion of a hydraulic circuit for a clutch included in the transmission of FIG. 2.

It is necessary to tune two clutch combinations to allow smooth shifting. The tuning is done through the use of orifices which can be adjusted to retard the flow from the clutch which is being disengaged. In this embodiment, both clutches C2 and C3 have these adjustable orifices in their hydraulic circuits. The retard is such that it is only workable when the clutches are being disengaged; that is, the pressure in the hydraulic circuit for the clutch is "coming down." FIG. 3 schematically shows the manner in which adjustment is accomplished. A check valve 60 is plumbed in parallel with an adjustable orifice 62 in the hydraulic path or circuit 64,65 for clutch C2, and an identical arrangement of check valve and adjustable orifice is provided in the hydraulic circuit (not shown) for clutch C3. Since either clutch C2 or clutch C3 is always in operation during forward speed selection, it is not necessary to provide an adjustable orifice for clutch C1. Obviously, it would be possible to provide the adjustable orifices in any two of the clutch circuits.

Referring again to FIG. 2, the block identified as 42 represents the hydraulic system for controlling the transmission, and there are four hydraulic circuits 44, 46, 48 and 50 leading from system 42 respectively to the four clutches C1, C2, C3 and C4. The location of the check valve 60 and orifice 62 is not critical, but a check valve and orifice combination may be provided in each of lines 46 and 48.

The hydraulic system has two control inputs identified as 52 and 54, and one of these inputs is operated to control the planetary drive unit 20 and the other is operated to control the speed changing unit 22 (slidable gear drive). The construction and operation of a hydraulic control system is not a part of the present invention and therefore will not be described herein. However, reference may be made to the aforementioned copending application for a detailed description of one hydraulic system.

Referring to FIG. 1 along with FIG. 2, the monitoring circuit 10 is only used with the transmission and transmission control of FIG. 2 when it is desired to adjust the clutches such as clutches C2 and C3. For this purpose, the pressure responsive switches 12 and 14 are tapped into the hydraulic circuits for any two of clutches C1, C2 and C3 so as to be responsive to hydraulic pressure in these circuits. For purposes of this description, it will be assumed that clutches C2 and C3 are being monitored and that clutch C3 is being engaged while clutch C2 is being disengaged. Thus, the pressure in the hydraulic circuit for clutch C3 will be coming up, and the pressure in the hydraulic circuit for clutch C2 will be coming down.

Figure 4:
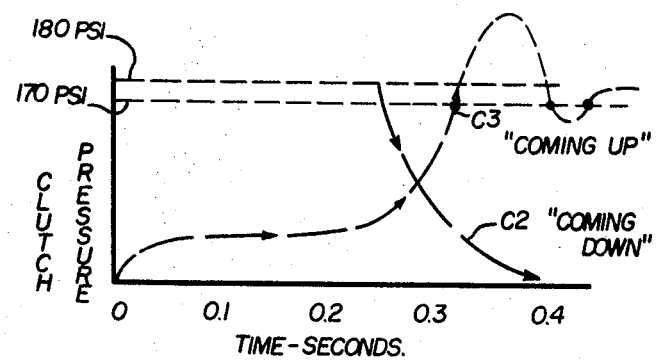
FIG. 4 is a plot of time versus pressure showing pressure curves for the hydraulic circuits of two clutches.

Curves are shown in FIG. 4 which depict this condition. It is apparent that the pressure in the hydraulic circuit for clutch C3 is increasing and the pressure in the hydraulic circuit for clutch C2 is decreasing as a shift occurs. The shift must occur such that on the one hand the load is not dropped, and on the other hand there is no dual pressurization of C2 and C3 to the extent that the transmission becomes locked. If the pressure in the hydraulic circuit for clutch C2 decreases before the pressure in the hydraulic circuit for clutch C3 rises sufficiently, the load would thus be disconnected and then reconnected suddenly producing jolt and high stresses in the transmission. On the other hand, if the pressure in clutch C3 builds up too high before the pressure in the hydraulic circuit for clutch C2 decreases sufficiently, both clutches would be almost fully pressurized at the same time resulting in a transmission lockup.

It has been found by experimentation that the upcoming pressure in clutch C3 or any other upcoming clutch is not an accurately predictable function. It varies from vehicle to vehicle; it varies with different clutch leakage rates; and it varies with temperature of the hydraulic fluid. It has been found, however, that the clutch plates of such a clutch will almost always become engaged within a band or range of pressures. For particular clutches used in the embodiment of FIG. 2, it has been found that the upcoming clutch is always filled and the clutch plates are engaged before the pressure in the clutch exceeds 170 p.s.i. In the majority of cases, the clutch plates become engaged after the pressure in the clutch hydraulic circuit exceeds 50 p.s.i. These two statements imply a band of pressures between 50 p.s.i. and 170 p.s.i. within which a smooth shift may be obtained. To accomplish this it is necessary to control the down coming clutch so that the swap shift occurs at the proper pressures. It has been found that a satisfactory shift will occur if the shift occurs (1) before the pressure in the upcoming clutch reaches a value of 170 p.s.i. and (2) before the pressure in the downcoming clutch reaches a value of 50 p.s.i. These values are satisfactory for particular clutches, but are not intended to limit the invention in any way.

Figure 5:
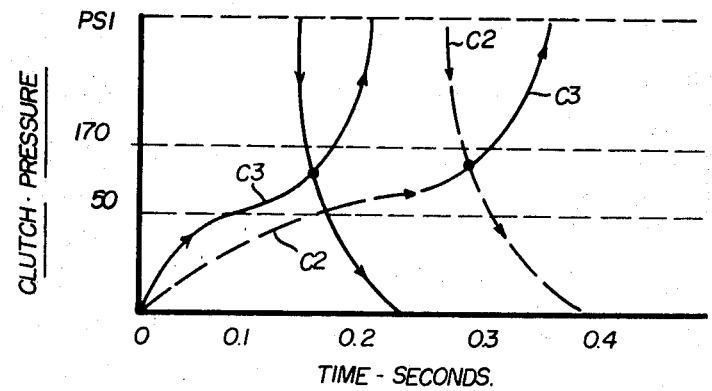
FIG. 5 is a plot of time versus pressure showing permissible variations in the curves of FIG. 4.

FIG. 5 is a plot which represents the desired conditions for a shift. Dotted horizontal lines are shown at 50 p.s.i. and 170 p.s.i. It is desired to have the shift occur within this pressure range. It may be seen that the two solid-line curves for clutches C2 and C3 represent one satisfactory swap shift, and the two dashed line curves for clutches C2 and C3 represent another satisfactory swap shift. Thus, it is apparent that it does not matter exactly when the shift occurs so long as it is certain or nearly certain that it will occur within the 50—170 p.s.i. range depicted in FIG. 5. This can be assured if the curve for clutch C3 intersects the 170 p.s.i. level at the same or almost the same instant as the curve for clutch C2 intersects the 50 p.s.i. level. Thus, as will be further explained, the monitoring circuit 10 makes it possible to control the clutches so that this will happen.

Referring again to FIG. 1, a positive supply bus 70 is connected to terminal 16 and a negative supply bus 72 is connected to terminal 18. The polarity of these buses can be reversed if desired. An on-off switch 74 is connected in bus 70. A reset switch 76 is connected in bus 72. Three control circuit paths are provided identified as 78, 80 and 82, and these same paths are also identified for purposes of description as red, blue and green respectively. These color designations correspond to the colors of red lamp R, blue lamp B, and green lamp G. The red and blue control circuit paths 78 and 80 are connected directly across buses 72 and 70, and the green control circuit path 82 is connected from 72 to an intermediate point in blue path 80.

The coil of relay CR2 is connected in series in path 78, the coil of relay CR1 is connected in series in path 80, and the coil of relay CR5 is connected in series in path 82. The contacts for these relays are shown in distributed form and will be described later.

Pressure switch 12, which is tapped into the hydraulic circuit of the upcoming clutch C3 for purposes of illustration, has two movable contacts 84 and 86. Contact 84 is associated with fixed contacts connected in path 78, and contact 86 is associated with fixed contacts connected in path 80. The movable contact 84 and the associated fixed contacts are designated jointly by the letters DE, and the movable contact 86 and the associated fixed contacts are designated jointly by the letters EF.

Pressure switch 14, which is tapped into the hydraulic circuit for the downcoming clutch C2 for purposes of illustration, has two movable contacts 88 and 90. Movable contact 90 is associated with fixed contacts connected in path 78, and movable contact 88 is associated with fixed contacts connected in path 80. Movable contact 90 and its associated fixed contacts are designated jointly by the letters AB, and movable contact 88 and its associated fixed contacts are designated jointly by the letters BC.

Figure 9:
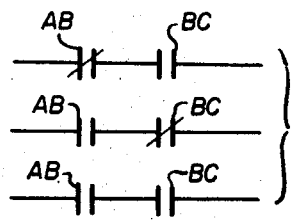
FIG. 9 is a schematic diagram showing different conditions of two contacts of a pressure switch included in the circuit of FIG. 1.

FIG. 9 shows three possible conditions for contacts AB and BC. In the uppermost condition, contacts AB are closed and contacts BC are open. In the intermediate condition, contacts AB are open and contacts BC are closed. In the lowermost condition, contacts AB and BC are both open, and this condition occurs only while the switch 14 is switching. The contacts DE and EF of switch 12 can be depicted in exactly the same way; that is, they have three possible conditions corresponding to those shown in FIG. 9.

Figure 10:
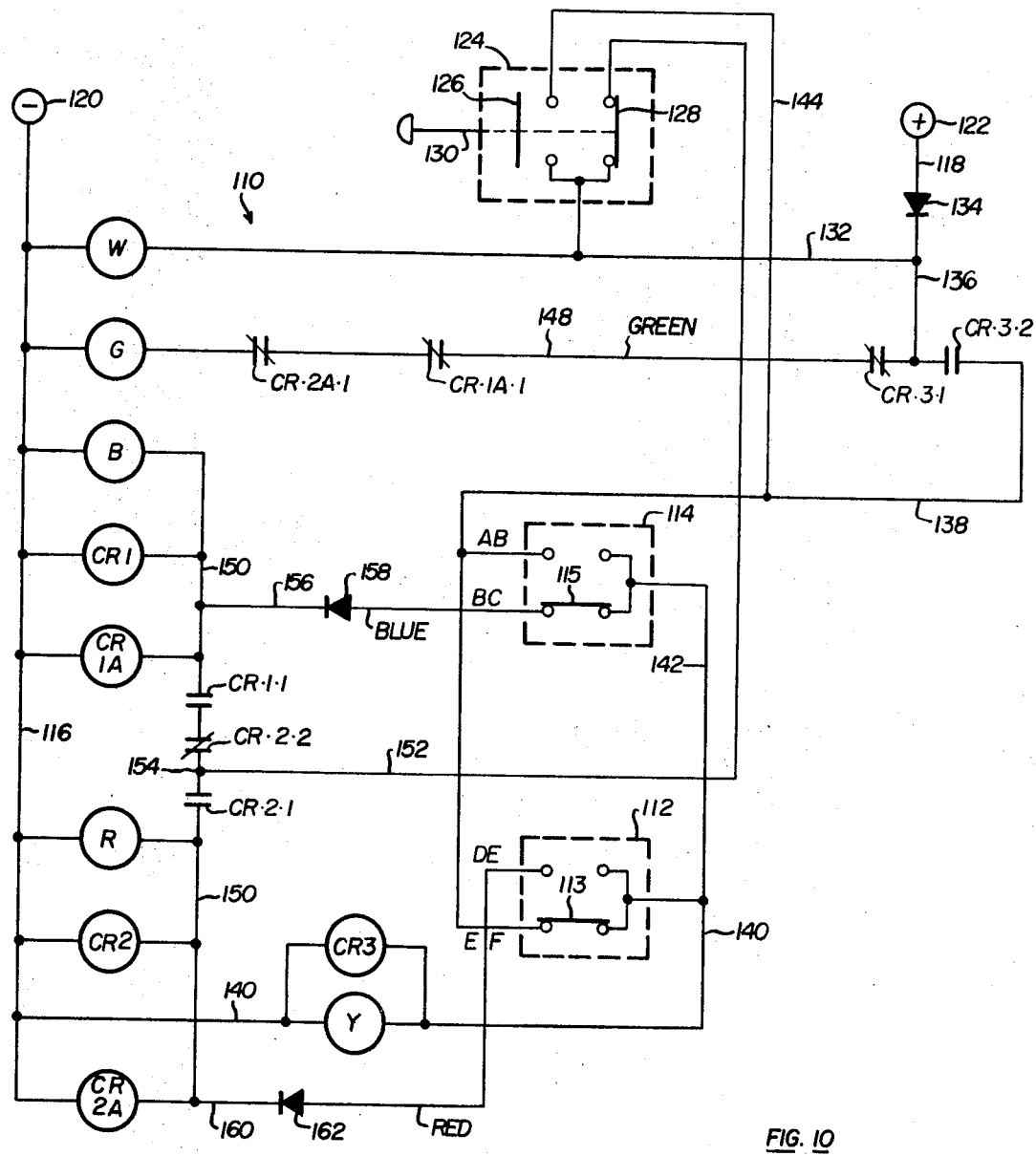
FIG. 10 is a schematic diagram of a modification of the circuit of FIG. 1.

The circuit of FIG. 10 operates such that the green light G comes on only when the two switches 12 and 14 have switched concurrently. That is, contacts AB, BC, DE and EF are all open at the same time. This does not mean that switches 12 and 14 must start opening or finish closing at exactly the same times, but their switching action must overlap in order for all four sets of contacts to be open at the same time and thus cause the green lamp G to be lit. If all four sets of contacts AB, BC, DE and EF are not open at the same time at some point in the sequence, either the red lamp R or the blue lamp B will be lit depending on what sequence occurs, as will be explained further. The switching action may be summarized by the following statements:

1. If the pressure in the downcoming clutch drops below 50 p.s.i. before the pressure in the upcoming clutch reaches 170 p.s.i., contacts BC and EF will be closed at the same time and the blue lamp B will be lit.

2. If the pressure in the downcoming clutch is above 50 p.s.i. after the pressure in the upcoming clutch exceeds 170 p.s.i., contacts AB and DE will be closed at the same time at some point in the sequence, and the red lamp R will be lit.

3. If the blue lamp has not been lit during the test and if the red lamp has not been lit during the test, then the green lamp will be lit.

A relay coil CR3 is connected in series with contacts CR1–1 between buses 72 and 70. The blue lamp B is connected in series with contacts CR3–1 between buses 70 and 72, and an interconnection 92 is provided from a point between lamp B and contacts CR3–1 to the point between relay coil CR3 and contacts CR1–1. Contacts CR1–1 and CR3–1 are normally open. The green lamp G is connected in series with contacts CR4–2, CR5–1 and CR3–2 between buses 70 and 72. Contacts CR4–2 and CR3–2 are normally closed, and contacts CR5–1 are normally open. A relay coil CR4 is connected in series with contacts CR2–1 between buses 70 and 72. Contacts CR2–1 are normally open. The red lamp R is connected in series with contacts CR4–1 between buses 70 and 72. Contacts CR4–1 are normally open. An interconnection 94 is provided from a point between lamp R and contacts CR4–1 to a point between relay coil CR4 and contacts CR2–1. The normal condition of the relay contacts are those which occur when the relay coils are deenergized.

An on-off indicator lamp W is connected directly across buses 70 and 72 such that when switch 74 is closed, lamp W is lit. A first yellow lamp Y-1 is connected from bus 72 to a point between contacts AB and relay coil CR2. Another yellow lamp Y-2 is connected from bus 70 to a point between relay coil CR1 and contacts EF. Lamps Y-1 and Y-2 are an aid to facilitate correctly positioning the pressure switches 12 and 14 in the hydraulic circuits for the clutches. Switch 14 is installed in the hydraulic circuit for the clutch which is already engaged (the "up" clutch), which will be considered herein to be clutch C2 for purposes of illustration. Pressure switch 12 is installed in the hydraulic circuit for the clutch which is to be engaged (the "down" clutch) in order to make a shift, and the "down" clutch will be considered to be clutch C3. Thus, clutch C3 is the "upcoming" clutch and clutch C2 is the "downcoming" clutch. When switch 12 is thus installed in the hydraulic circuit for clutch C3, contacts EF will be closed and contacts DE will be open as shown in FIG. 1. When switch 14 is installed in the hydraulic circuit for clutch C2 which is then engaged due to pressure therein, contacts BC will be open and contacts AB will be closed contrary to the position for these contacts shown in FIG. 1. Relay coil CR1 will remain deenergized when switch 74 is closed because contacts BC are open at the start of a test, and relay coil CR2 will also remain deenergized because contacts DE are open at the start of a test. The yellow lamps Y-1 and Y-2 will be lit indicating a proper installation of the pressure switches. Relay coil CR5 will remain deenergized because contacts BC are open. Relay coils CR-3 and CR-4 will also be deenergized because there are open contacts in all possible energizing paths for these relay coils. Lamps B, G and R will be extinguished also because there are open contacts in all possible energizing paths for these lamps.

Figure 6:
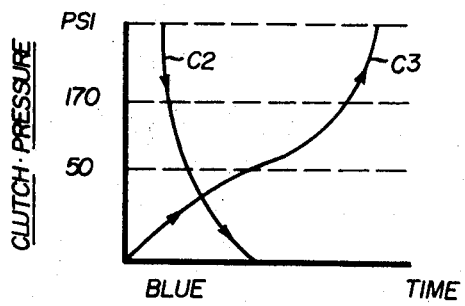
FIG. 6 is a plot of time versus pressure showing pressure curves for two clutches when an improper shift has occurred.

FIG. 6 illustrates a possible sequence of operation for the circuit 10 which results in lighting of the blue lamp B. During a shift, pressure in the hydraulic circuit for clutch C2 decays to a value of 50 p.s.i. before pressure in the hydraulic circuit for clutch C3 increases to a value of 170 p.s.i. When clutch C2 reaches 50 p.s.i., contacts AB open and contacts BC close. Circuit path 80 is then complete, so relay coil CR1 energizes. Relay coil CR5 also energizes, but it will be shown that green lamp G does not light. Due to the energization of relay coil CR1, contacts CR1-1 close to light the blue lamp B and also to energize relay coil CR3. Contacts CR3-1 close to latch in the blue lamp and relay coil CR3. Contacts CR3-2 open so that green lamp G does not become lit even though contacts CR5-1 do close.

When the pressure in the hydraulic circuit for clutch C3 reaches 170 p.s.i., switch 12 is actuated to open contacts EF and close contacts DE. This deenergizes relay coil CR1, but blue lamp B remains lit because relay coil CR3 is latched in.

The lighting of the blue lamp B indicates that the pressure in the hydraulic circuit for clutch C2 has decayed too soon, so orifice 62 for this clutch is adjusted and the test is repeated. Before repeating the test, reset button 76 is momentarily depressed to return all relays connected thereto to their deenergized condition.

Figure 8:
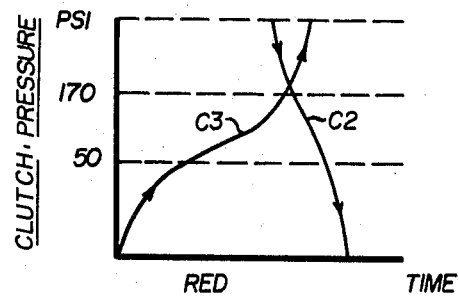
FIG. 8 is a plot of time versus pressure for two clutches showing pressure curves for two clutches when an improper shift has occurred, the clutches having operated in a different manner than that depicted in FIG. 6.

The start condition is again achieved, and as previously mentioned, in this condition contacts AB are closed, contacts BC are open, contacts DE are open and contacts EF are closed. The shift is made again, and it will be assumed in this case that the shift occurs according to the curves of FIG. 8. It may be seen from FIG. 8 that pressure in the hydraulic circuit for clutch C3 increases to a value of 170 p.s.i. before pressure in the hydraulic circuit for C2 decreases to a value of 50 p.s.i. When clutch C3 reaches 170 p.s.i., switch 12 is actuated to open contacts EF and close contacts DE. Contacts AB and DE are then both closed, so circuit path 78 is completed to energize relay coil CR2. Contacts CR2-1 close to energize relay coil CR4 and also to light the red lamp R. When relay coil CR4 is energized, contacts CR4-1 close to latch in both coil CR4 and lamp R.

The clutches are restored to the start condition, and as previously mentioned, switch 14 is then in a position wherein contacts BC are open and contacts AB are closed. It will be assumed that as the shift occurs, the pressure in the clutches C2 and C3 follow the curve shown in FIG. 7. It may be seen from FIG. 7 that the pressure in clutch C3 reaches a value of 170 p.s.i. at substantially the same time (T2) that the pressure in clutch C2 reaches a value of 50 p.s.i. Thus, switches 12 and 14 are actuated at the same time or concurrently so that contacts AB, BC, DE and EF are all open at the same time. Thus, when the switching occurs, neither relay coil CR1, nor CR2, nor CR5 will be energized. After switch 14 has reached the position shown in FIG. 1, relay coil CR5 will be energized. Relay coil CR1 and CR2 will remain deenergized. When relay coil CR5 is energized, contacts CR5-1 close, and since contacts CR3-2 and CR4-2 remain closed, the green lamp G is lit. The lighting of this lamp indicates that a proper shift has occurred, and no further adjustment of the clutches is required.

Figure 7:
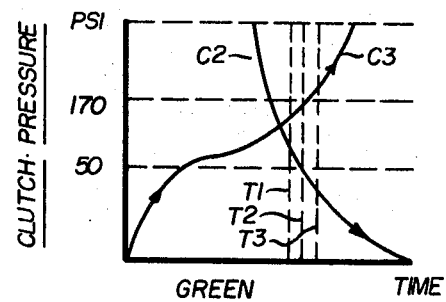
FIG. 7 is a plot of time versus pressure showing pressure curves for two clutches when a proper shift has occurred.

It may be noted from FIG. 7 that vertical dashed lines T1 and T3 are shown. These lines are intended to indicate that the switching of switches 12 and 14 actually occurs over a finite period of time, even though it may be very short. In order for the green lamp G to be lit, it is only necessary that contacts AB, BC, DE and EF all be open simultaneously at some instant during the interval T1—T3. Thus, it would be possible for one switch to start switching before the other switch starts switching. However, the pressure switches are preferably selected so as to have a very short transit time, for example, by utilizing pressure switches which operate by snap action. It is not essential to use a snap-action switch, but it is desirable to keep the transit time of the switches relatively short so as to maximize the discrimination of the circuit. Also, it is desirable to use relays having a fast response time, and reed relays are suitable for this purpose. Reed relays having a response time of about 0.0001 second may be utilized.

Referring again to FIG. 4, it may be seen that the curve for clutch C3 rises to a peak and then dips and rises again before leveling out at the 180 p.s.i. level. It may be seen that this curve traverses the 170 p.s.i. level three times; that is, there are additional traverses of the 170 p.s.i. level considerably after the first meaningful traverse has been made. With the circuit of FIG. 1, it would be possible for a red light and a blue light to be illuminated at the same time if the conditions depicted in FIG. 3 actually occurred. If such conditions are expected, the modified circuit 110 of FIG. 10 may be employed. This circuit will respond to an initial signal and henceforth will remain immune to further input signals produced by transient conditions which are void of pertinent information. Specifically, once a green, red or blue light has been lit, no other light can be lit.

Referring to FIG. 10, the circuit 110 includes pressureresponsive switches 112 and 114 which are substantially the same as switches 12 and 14 in FIG. 1 except that switch 114 has only one movable contact 115 and switch 112 has only one movable contact 113. For purposes of discussion, it will be assumed that switch 114 is installed to be responsive to pressure in the hydraulic circuit for clutch C2 which is the downcoming clutch, and switch 112 is installed in the hydraulic circuit for clutch C3 which is the up coming clutch. Switch 114 is set to actuate at 50 p.s.i. and switch 112 is set to actuate at 170 p.s.i. of hydraulic pressure. Referring to switch 114, fixed contacts AB are normally open and fixed contacts BC are normally closed. Referring to switch 112, fixed contacts DE are normally open and fixed contacts EF are normally closed. However, since switch 114 is associated with the downcoming clutch which is initially pressurized, contacts AB would be closed by movable contact 115 at the beginning of a cycle of operation.

Circuit 110 includes a negative supply bus 116 connected to terminal 120 and a positive supply bus 118 connected to terminal 122. A reset switch 124 is provided and includes a movable contact 126 which is normally open with respect to the associated fixed contacts, and also includes movable contact 128 which is normally closed with respect to the associated fixed contacts. An actuator 130 is provided for switch 124 for momentarily actuating the switch to reverse the contact configuration.

Positive bus 118 is connected through a rectifier 134 to a line 132 which is connected to one side of the fixed contacts associated with movable contacts 126 and 128. Line 132 is also connected to a white lamp W which in turn is connected to negative supply bus 116. Thus, wherever power is supplied to terminals 120 and 122, the white lamp W will be lit. The cathode of rectifier 134 is connected by line 136 to a line 138 which serves as an auxiliary positive bus. Line 138 is connected to one side of fixed contacts AB of switch 114 and is also connected to one side of fixed contacts EF of switch 112.

A line 140 and associated line 142 are connected from negative supply bus 116 through a yellow lamp Y and the coil of a parallel relay CR3 to the other sides of all of the fixed contacts AB, BC, DE and EF. Thus, when movable contacts 113 and 115 are in either of their stable positions, a circuit is made between line 140 and line 138. However, line 138 has normally open contacts CR3-2 of relay CR3 therein, so relay coil CR3 is initially deenergized. As will be apparent, no other relay in the circuit 110 can be activated, whatever the contact combinations of switches 112 and 114, until the normally open contacts CR3-2 become closed to latch in relay CR3, thus providing power to the pressure switches 112 and 114.

This latching in operation is performed by pressing actuator 130 of reset switch 124, thus completing a circuit from line 132, which is normally energized, through movable contact 126 and line 144 to 138, thus bypassing normally open contacts CR3-2 and allowing current to flow through movable contacts 113 and 115, lines 140 to 142 and relay coil CR3 to negative bus 116, thereby energizing coil CR3 to close normally open contacts CR3-2 so as to latch in relay CR3. This also lights the yellow lamp Y provided the switches 112 and 114 have been properly installed.

When relay coil CR3 is energized, relay contacts CR3-1 open to prevent lighting of the green lamp G which is connected in line 148. Thus, it is apparent that the green lamp G cannot be lit until relay CR3 drops out at some later stage of the cycle.

Relays CR1 and CR2 act to record certain conditions of the pressure switches. Relays CR1 and CR2 are connected between line 116 and another line 150 in which normally open contacts CR1-1 and CR2-2 are provided. A line 152 is connected to a point 154 between contacts CR1-1 and CR2-1, and normally closed contacts CR2-2 are connected between contacts CR1-1 and point 154. Relays CR1, CR1A, CR2 and CR2A are connected between lines 116 and 150, and red lamp R and blue lamp B are also connected between lines 116 and 150 in the manner shown in FIG. 10. Relay CR1A has contacts CR1A-1 in line 148, and relay CR2A has contacts CR2A-1 in line 148 for the green lamp G. Line 150 is connected by line 156 through a rectifier 158 to contacts BC, and line 150 is similarly connected by a line 160 through a rectifier 162 to contacts DE.

It may be noted that once switch 114 has assumed the position shown in FIG. 10, (after the associated pressure being monitored has come down beyond 50 p.s.i.), and the other switch 112 has assumed a configuration in which movable contact 113 closes fixed contacts DE (after the upcoming pressure has exceeded 170 p.s.i.), there is no way for the latching power to reach relay coil CR3, so relay CR3 drops out, thereby removing power from the switches 112 and 114. This is an important feature because it prevents later actuation of any relays in the circuit 110. However, the operation of the circuit will be described assuming that switch 112 is initially in the condition shown in FIG. 10 wherein contacts DE are open and contacts EF are closed, and switch 114 is in the opposite position to that shown such that contacts AB are closed by movable contact 115 and contacts BC are open. It will be assumed that the reset actuator 130 has been temporarily actuated so that relay CR3 is energized as previously described. Since contacts CR1-1 and CR1-2 are open, and contacts CR3-1 are open, the lamps R, B and G are all out. As previously explained, the white lamp W and the yellow lamp Y are energized or lit.

After a swap shift is in progress, and if the downcoming pressure should fall below 50 p.s.i. before the upcoming pressure reaches 170 p.s.i., switch 114 will switch first. At this instant, contact 115 will close fixed contacts BC so that current is supplied from line 138 through movable contact 113, line 142, contact 115, rectifier 158, line 156 and line 150 to energize relay coils CR1 and CR1A and light the blue lamp B. Contacts CR1-1 will close to latch in relay coils CR1 and CR1A with current from line 152. Contacts CR1A-1 in line 148 open to prevent lighting of the green lamp G. Since the blue lamp B has been lit, there is an indication to the monitoring personnel that the downcoming pressure is not retarded sufficiently, and an adjustment is made to correct this situation. It will be assumed that the adjustment is too great so that the following cycle of operation takes place.

The reset button 130 is temporarily pushed again, and when movable contact 128 opens, power is removed from line 152, thus dropping out all of the relays presently energized. The clutches are returned to the initial position, thus returning movable contacts 113 and 115 to their start positions. When contact 126 of reset switch 124 closes the associated fixed contacts, power is applied to line 144, thus bypassing normally open contacts CR3-2 to energize relay coil CR3 in accordance with the previous description, thus closing latching contacts CR3-2 and opening contacts CR3-1.

All lamps are extinguished except the white lamp W and the yellow lamp Y.

When a shift is made, the downcoming pressure in clutch C2 maintains a relatively high level until the upcoming pressure in clutch C3 exceeds 170 p.s.i. When this occurs, switch 112 is actuated before switch 114. At this instant, movable contacts 113 close fixed contacts DE and movable contact 115 still closes fixed contacts AB. Thus, current flows from line 138 through movable contact 115, line 142, movable contact 113, rectifier 162, line 160 and line 150 to energize relay coils CR2 and CR2-A and also to light the red lamp R. Contacts CR2-1 close to latch in these relay coils with current from line 152, and contacts CR2A-1 open to prevent lighting of the green lamp G. When switch 114 is later actuated such that contact 115 moves to the position shown in FIG. 10 wherein it closes contacts BC, this breaks the flow of current through relay coil CR3, so this relay drops out. Even though contacts CR3-1 close, contacts CR2A-1 are still open, so the green lamp G is not lit. Since contacts CR3-2 open, it is not possible for any later change in the condition of these switches to cause any change in the condition of the lamps.

It will be assumed that a further adjustment of the clutches is made to produce a proper swap shift with the following cycle of operation. The reset switch 124 is operated in accordance with the previous description, so the white lamp W and the yellow lamp Y are lit and relay CR3 is energized. It will be apparent from the foregoing description that if neither CR1 nor CR2 has been latched in during the switching sequence, which condition will occur only if switches 112 and 114 are actuated concurrently, then contacts CR2A-1 and CR1A-1 will remain closed. As the pressure switches 112 and 114 assume their final positions wherein switch 114 is at zero p.s.i. and switch 112 is at 180 p.s.i., the supply of current from line 138 to 140 is interrupted, so relay coil CR3 is deenergized causing this relay to drop out. Contacts CR3-2 open, and contacts CR3-1 close. Since both contacts CR1A-1 and CR2A-1 are still closed, the green lamp G lights at this time. This indicates that a proper swap shift has occurred. There is no way for this circuit condition to be interrupted with a red or blue lamp being lit because there is no way for electricity to reach coils CR1 or CR2 through the pressure switches 112 and 114 because latching contacts CR3-2 are open.

Thus, it can be seen that the circuit of FIG. 10 achieves the same overall purpose as the circuit of FIG. 1 in that the green lamp will be lit only if neither the blue lamp nor the red lamp is lit during the swap shift. This necessary condition for lighting of the green lamp will prevail only if both pressure switches 112 and 114 switch concurrently, as previously explained.

From the foregoing description, it is apparent that the invention provides a monitoring circuit which makes it possible to accurately adjust clutches of a transmission so as to achieve proper switching. The discrimination of the monitoring circuit is excellent, and it is relatively simple, economical to manufacture, easy to operate and reliable in operation.

Having thus described by invention, I claim:
1. A monitoring circuit responsive to first and second varying fluid pressures to provide an indication of a condition wherein the first pressure reaches a first value at the same or nearly the same time as the second pressure reaches a second value, said circuit comprising power-supplying means, a first circuit path connected to said power-supplying means, a second circuit path connected to said power-supplying means, first pressure-responsive switch means having normally open contacts in one of said circuit paths and normally closed contacts in the other of said circuit paths, second pressure-responsive switch means having normally open contacts in one of said circuit paths and normally closed contacts in the other of said circuit paths, a third circuit path connected to said power-supplying means, first, second and third relays respectively having coils in said first, second and third circuit paths, a fourth circuit path connected to said power-supplying means, a readout device in said fourth circuit path, and first, second and third contacts in said fourth circuit path operable respectively in response to operation of said first, second and third relay coils to control said readout device, said first and second pressure-responsive switch means being adapted to switch in response to said certain pressure values and said contacts thereof being arranged so that operation of said third contacts in said fourth circuit path is effective to actuate said readout device only if all of the contacts of said first and second switch means in said first and second circuit paths have opened concurrently, thus indicating that said pressures have reached said certain values at the same time or within a time interval no greater than the transit time of one of said switch means.

2. The monitoring circuit as claimed in claim 1 in which said normally open contacts of said first and second switch means are in the same circuit path and said normally closed contacts of said first and second switch means are in the same circuit path, one of said pressures initially being sufficient to actuate one of said switch means to the nonnormal condition thereof and the other of said pressures initially being insufficient to actuate the other switch means to the nonnormal condition thereof, said one pressure normally decreasing and said other pressure normally increasing.

3. The monitoring circuit as claimed in claim 2 in which said first and second contacts in said fourth circuit path are respectively operated by fourth and fifth relay coils connected to said power supplying means which are in turn operated in conjunction with said first and second relays, said third contacts being operated by said third relay coil.

4. The monitoring circuit as claimed in claim 3 in which said readout device is an indicator lamp and including two additional indicator lamps operated in conjunction with said fourth and fifth relays respectively, to indicate conditions wherein said contacts of said first and second pressure-responsive switch means do not all open concurrently.

5. The monitoring circuit as claimed in claim 4 including contacts in circuit with said switches and operable with said third relay to interrupt power to said switches for preventing false operation after an initial signal.

6. A monitoring circuit responsive to first and second varying fluid pressures to provide an indication of a condition wherein the first pressure reaches a first value at substantially the same time as the second pressure reaches a second value, said circuit comprising power-supplying means, a first circuit path connected to said power-supplying means, a second circuit path connected to said power-supplying means, first pressure-responsive switch means having normally open contacts in said first circuit path and normally closed contacts in said second circuit path, second pressure-responsive switch means having normally open contacts in said first circuit path and normally closed contacts in said second circuit path, a third circuit path connected to said power-supplying means, first, second and third relays respectively having coils in said first, second and third circuit paths, a fourth circuit path connected to said power-supplying means, said third relay having contacts in said fourth circuit path, an indicator device in said fourth circuit path, fourth and fifth relays connected to said power-supplying means, further contacts in said fourth circuit path operated in response to said fourth and fifth relays, said first and second relays having contacts respectively in circuit with said fourth and fifth relays, said first and second pressure-responsive switch means being adapted to switch in response to said certain pressure values with said first switch means being normally actuated, whereby operation of said contacts of said third relay in said fourth circuit path is effective to actuate said indicator device only after all of the contacts of said first and second switch means in said first and second circuit paths have opened concurrently.

7. A monitoring circuit responsive to first and second varying fluid pressures to provide an indication of a condition wherein the first pressure reaches a first value at substantially the same time as the second pressure reaches a second value, said circuit comprising power-supplying means, (1) first, second and third circuit paths connected to said power-supplying means, (2) first pressure-responsive switch means having normally open contacts in said first circuit path and normally closed contacts in said second and third circuit paths, (3) second pressure-responsive switch means having normally open contacts in said first circuit path and normally closed contacts in said second circuit path, (4) first, second and third relays respectively having coils in said first, second and third circuit paths, (5) a fourth circuit path connected to said power-supplying means, said third relay having contacts in said fourth circuit path, (6) a first indicator device in said fourth circuit path, (7) fourth and fifth relays connected to said power-supplying means and each having contacts in said fourth circuit path, (8) said first and second relays having contacts respectively in circuit with said fourth and fifth relay, (9) said first and second pressure-responsive switch means being adapted to switch in response to said certain pressure values with said first switch means being normally actuated, whereby closing of said contacts of said third relay in said fourth circuit path is effective to actuate said first indicator device only after all of the contacts of said first and second switch means in said first, second and third circuit paths have opened concurrently, and second and third indicator devices connected to said power-supplying means, said first and second relays having contacts respectively in circuit with said second and third indicator devices for operating the same selectively when said first and second switch means do not switch concurrently.

8. A monitoring circuit for monitoring fluid pressures in the hydraulic circuits of two clutches of a transmission being shifted to provide an indication of a condition wherein one of said pressures decreases to a first value at the same or nearly the same time as the other pressure increases to a second value, said circuit comprising (1) power-supplying means, (2) first and second control circuit paths connected to said power-supplying means, (3) first pressure-responsive switch means having normally open contacts in one of said circuit paths and normally closed contacts in the other of said circuit paths, (4) second pressure-responsive switch means having normally open contacts in one of said circuit paths and normally closed contacts in the other of said circuit paths, (5) an indicator connected to said power-supplying means, and (6) a third control circuit path connected to said power-supplying means, (7) relay means in said third control circuit path having contacts in circuit with said indicator for actuating the same, (8) control means including control relay means in said first and second control circuit paths, (9) further contacts in circuit with said indicator and operable in conjunction with said control relay means, said first and second pressure-responsive switch means being adapted to switch in response to said first and second values, and said contacts being arranged so that said indicator is actuated only if all of the contacts of said first and second switch means in said first and second circuit paths have opened concurrently.

9. A monitoring circuit for monitoring fluid pressures in the hydraulic circuit of two clutches of a transmission being shifted to provide an indication of a condition wherein one of said pressures decreases to a first value at the same or nearly the same time as the other pressure increases to a second value, said circuit comprising (1) power-supplying means, (2) first, second and third control circuit paths connected to said power-supplying means, (3) first pressure-responsive switch means having normally open contacts in one of said circuit paths and normally closed contacts in the others of said circuit paths, (4) second pressure-responsive switch means having normally open contacts in one of said circuit paths and normally closed contacts in another of said circuit paths (5) an indicator connected to said power-supplying means, and (6) relay means in said third control circuit path having contacts in circuit with said indicator for actuating the same, and (7) control means including relay means in said first and second control circuit paths and contacts in circuit with said indicator, said first and second pressure-responsive switch means being adapted to switch in response to said first and second values, and said contacts being arranged so that said indicator is actuated only if all of the contacts of said first and second switch means in said first, second and third circuit paths have opened concurrently.